(12) United States Patent
Yabuguchi et al.

(10) Patent No.: US 9,037,351 B2
(45) Date of Patent: May 19, 2015

(54) STEERING CONTROL DEVICE (71) Applicants: Michisada Yabuguchi, Aichi (JP); Sambon Lee, Aichi (JP); Satoshi Doba, Aichi (JP)

(72) Inventors: Michisada Yabuguchi, Aichi (JP); Sambon Lee, Aichi (JP); Satoshi Doba, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/157,233

(22) Filed: Jan. 16, 2014

(65) Prior Publication Data

US 2014/0200771 A1 Jul. 17, 2014

(30) Foreign Application Priority Data

Jan. 17, 2013 (JP) ................. 2013-006782

(51) Int. Cl.
*B62D 5/00* (2006.01)
*B62D 5/04* (2006.01)
*B62D 6/00* (2006.01)

(52) U.S. Cl.
CPC ............... *B62D 5/0493* (2013.01); *B62D 5/00* (2013.01); *B62D 6/00* (2013.01)

(58) Field of Classification Search
CPC .......... B62D 5/00; B62D 5/04; B62D 5/0463; B62D 6/00; B62D 11/00; B62D 12/00
USPC .............. 701/36, 41–44, 29.2, 30.4; 180/400, 180/404, 406, 443, 444, 446; 318/434
See application file for complete search history.

(56) References Cited

U.S. PATENT DOCUMENTS

| 5,150,021 | A  | * | 9/1992 | Kamono et al. | ............... | 318/488 |
| 6,513,619 | B2 | * | 2/2003 | Amakusa et al. | ............. | 180/404 |
| 6,727,671 | B2 | * | 4/2004 | Ito et al. | ........................ | 318/432 |
| 8,121,759 | B2 | * | 2/2012 | Tamaki | .......................... | 701/41 |
| 2014/0107893 | A1 | * | 4/2014 | Nishimura | ...................... | 701/41 |

FOREIGN PATENT DOCUMENTS

| JP | 2002-059855 A | 2/2002 |
| JP | 2006-051912 A | 2/2006 |

(Continued)

OTHER PUBLICATIONS

Patent Abstracts of Japan, Japanese Publication No. 2009-132344, dated Jun. 18, 2009 (1 page).
Patent Abstracts of Japan, Japanese Publication No. 2002-059855, dated Feb. 26, 2002 (1 page).

(Continued)

*Primary Examiner* — Thomas Tarcza
*Assistant Examiner* — Tyler J Lee
(74) *Attorney, Agent, or Firm* — Osha Liang LLP (57) ABSTRACT A steering control device has a filter section configured to remove a high frequency component from an output of a torque sensor configured to detect a steering torque of a steering device mounted on a vehicle, a current command section configured to output a current command value based on a travelling speed of the vehicle and an output of the filter section, a drive control section configured to control a drive of a motor configured to aid a steering of the steering device based on the current command value, and a drive prohibiting section configured to output a signal for prohibiting the drive of the motor to the drive control section based on the output of the torque sensor, the current command value, and the travelling speed of the vehicle.

3 Claims, 5 Drawing Sheets

(56) References Cited

FOREIGN PATENT DOCUMENTS

| | | |
|---|---|---|
| JP | 2008-238843 A | 10/2008 |
| JP | 2009-132344 A | 6/2009 |

OTHER PUBLICATIONS

Patent Abstracts of Japan, Japanese Publication No. 2006-051912, dated Feb. 23, 2006 (1 page).

\* cited by examiner

STEERING CONTROL DEVICE

BACKGROUND OF THE INVENTION

1. Technical Field

The present invention relates to steering control devices, and in particular, to a steering control device for detecting a steering torque applied on a steering, and controlling current flowing to a motor for driving the steering.

2. Related Art

A motor-driven power steering control device including a torque sensor for detecting the steering torque applied on a steering system by a driver of a vehicle, and a low pass filter for removing high frequency components is conventionally known. In such a motor-driven power steering control device, a drive current of a drive motor for applying a steering auxiliary force with respect to the steering torque by the driver is obtained based on outputs from the torque sensor and the low pass filter.

For example, Japanese Unexamined Patent Publication No. 2009-132344 discloses a motor-driven power steering control device that addresses a current command value rapidly changing and the vehicle becoming unstable immediately after an abnormality of the steering torque is detected. Such motor-driven power steering control device includes a torque sensor for detecting the steering torque of the steering, a low pass filter for removing the high frequency components of the output from the torque sensor, a torque command calculation unit for calculating a current command value based on the output from the low pass filter, and the like. The motor-driven power steering control device increases the time constant of the low pass filter when the abnormality of the steering torque is detected.

It is also conventionally known to control the current flowing to the motor for driving the motor-driven power steering device based on a torque sensor for detecting the steering toque applied on the steering system by the driver of the vehicle and a vehicle speed sensor for detecting the vehicle speed.

In such motor-driven power steering device, if the motor is controlled to a direction of assisting the left turn even if the driver is turning the steering wheel to the right, this goes against the will of the driver thus causing the driver to feel a sense of discomfort. The reason for the occurrence of such abnormality may be the abnormality of the CPU that computes the command current for driving the motor based on the steering torque. As a measure for such abnormality, a technique of stopping the drive of the motor when the direction of the output of the torque sensor and the direction of the target value of the command current or the direction of the current flowing to the motor do not coincide.

For example, Japanese Unexamined-Open Patent Publication No. 2002-059855 discloses a motor-driven power steering device in an aim of performing abnormality determination at high accuracy even when a damping control and the like is being carried out, and reliably prohibiting the drive of an electric motor at the time of abnormality. Such motor-driven power steering device includes a control section for controlling the electric motor, and a drive prohibiting section for prohibiting the drive of the electric motor at the time of abnormality. The drive prohibiting section determines whether or not the magnitude and the direction of the steering torque and the magnitude and the direction of the electric motor current satisfy a predetermined prohibiting condition, integrates the time in which the predetermined prohibiting condition is satisfied, and prohibits the drive of the electric motor when the integrated time becomes greater than or equal to a predetermined time.

Japanese Unexamined-Open Patent Publication No. 2008-238843 discloses a motor-driven power steering device in an aim of prohibiting unnatural behavior of the steering. The motor-driven power steering device checks point coordinates of a combination of the steering torque and the motor current with a window time setting map to determine the window time. The motor-driven power steering device determines to stop the drive of the motor when the point coordinates continuously exist for the window time in a region corresponding to the determined window time, and stops the drive of the drive controlled motor.

Japanese Unexamined-Open Patent Publication No. 2006-051912 discloses a motor-driven power steering device in an aim of detecting the abnormal state more quickly even when the vehicle speed is large, and stopping the steering aid. Such motor-driven power steering device includes an assist map showing the correspondence relationship between the current target value and the steering torque, and outputs the current target value with reference to the assist map. The motor-driven power steering device includes a drive prohibiting map including the condition for stopping the steering aid as a predetermined drive prohibiting region, and determines whether or not to stop the steering aid with reference to the drive prohibiting map. The motor-driven power steering device selects the drive prohibiting map including a relatively wide drive prohibiting region only when the vehicle speed is large and the detection value of the motor current is small, and stops the motor when the current target value and the steering torque accord with the condition shown in the selected drive prohibiting map.

It is known to perform low pass filtering process on the output of the torque sensor as disclosed in Japanese Unexamined-Open Patent Publication No. 2009-132344. The high frequency component is thereby removed from the output of the torque sensor, and the high frequency component of the current flowing to the motor is also reduced. The vibration from the steering wheel is thus also alleviated, enhancing the comfortableness in driving.

SUMMARY

However, the computation time of the low pass filtering process being necessary may result in the following. For example, when the driver rapidly switches the steering wheel from the right direction to the left direction, the motor rotates in the direction of assisting the right turn until elapse of the time required for the computation of the low pass filtering process. Since the actual steering wheel is rotated to the left by the driver, the rotating direction of the motor and the rotating direction of the steering wheel become opposite, although for a short time. The CPU then determines that abnormality has occurred in the process of computing the command current based on the steering torque, and stops the drive of the motor. Thus, the steering assistance of the motor-driven power steering for the driver is suddenly interrupted, which may cause a sense of discomfort.

Such situation relatively easily occurs when the vehicle speed is low. For example, since the steering wheel needs to be rapidly turned to the left and the right when parking the vehicle in the garage or when performing parallel parking, the steering torque and the command current tend to easily be in an abnormal state, and the number of times the rotating direction of the motor and the rotating direction of the steering wheel become opposite, although for a short time, tends to increase. When the rotating direction of the motor and the rotating direction of the steering wheel are opposite, a force stronger than usual is necessary to turn the steering wheel. However, accidents rarely occur therefrom since the vehicle speed is low. Even if a temporary abnormality actually has occurred in the CPU, accidents rarely occur since the vehicle speed is low. Therefore, according to one or more embodiments of the present invention, when the vehicle speed is low, the drive of the motor is not immediately stopped, even when the relationship between the steering torque and the command current is abnormal in terms of comfortableness in driving.

If the vehicle speed is high, on the other hand, the opportunity to rapidly turn the steering wheel is few, and the steering torque and the command current are less likely to be in an abnormal state. Thus, according to one or more embodiments of the present invention, the drive of the motor is immediately stopped when the steering torque and the command current are in an abnormal state. Furthermore, according to one or more embodiments of the present invention, the drive of the motor is immediately stopped in the interest of safety if the abnormality actually has occurred in the CPU.

One or more embodiments of the present invention provides a steering control device that satisfies both comfortableness and safety in driving.

In accordance with one or more embodiments of the present invention, a steering control device includes a filter section configured to remove a high frequency component from an output of a torque sensor configured to detect a steering torque of a steering device mounted on a vehicle; a current command section configured to output a current command value based on a travelling speed of the vehicle and an output of the filter section; a drive control section configured to control a drive of a motor configured to aid a steering of the steering device based on the current command value; and a drive prohibiting section configured to output a signal for prohibiting the drive of the motor to the drive control section based on the output of the torque sensor, the current command value, and the travelling speed of the vehicle; wherein the drive prohibiting section includes an abnormality determination unit configured to determine whether or not a relationship between the output of the torque sensor and the current command value is abnormal, a window time selecting unit configured to select a window time based on the travelling speed of the vehicle, and a prohibiting signal output unit configured to output the signal for prohibiting the drive of the motor to the drive control section based on outputs of the abnormality determination unit and the window time selecting unit; and the prohibiting signal output unit outputs the signal for prohibiting the drive of the motor to the drive control section when a time in which a determination result of the abnormality determination unit indicates abnormality exceeds a window time selected by the window time selecting unit.

Accordingly, the steering control device that satisfies both comfortableness and safety in driving can be provided.

Furthermore, the window time selecting unit may select a short window time when the travelling speed of the vehicle is greater than or equal to a predetermined value.

Accordingly, the steering control device in which the safety in driving is more enhanced can be provided.

In accordance with one or more embodiments of the present invention, a steering control device includes a filter section configured to remove a high frequency component from an output of a torque sensor configured to detect a steering torque of a steering device mounted on a vehicle; a current command section configured to output a current command value based on a travelling speed of the vehicle and an output of the filter section; a drive control section configured to control a drive of a motor configured to aid a steering of the steering device based on the current command value; and a drive prohibiting section configured to output a signal for prohibiting the drive of the motor to the drive control section based on the output of the torque sensor, the current command value, and an angular speed of the steering device; wherein the drive prohibiting section includes an abnormality determination unit configured to determine whether or not a relationship between the output of the torque sensor and the current command value is abnormal, a window time selecting unit configured to select a window time based on the angular speed of the steering device, and a prohibiting signal output unit configured to output the signal for prohibiting the drive of the motor to the drive control section based on outputs of the abnormality determination unit and the window time selecting unit; and the prohibiting signal output unit outputs the signal for prohibiting the drive of the motor to the drive control section when a time in which a determination result of the abnormality determination unit indicates abnormality exceeds a window time selected by the window time selecting unit.

Accordingly, the steering control device that satisfies both comfortableness and safety in driving can be provided.

As described above, according to one or more embodiments of the present invention, the steering control device that satisfies both comfortableness and safety in driving can be provided.

DETAILED DESCRIPTION

Embodiments of the present invention will be hereinafter described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
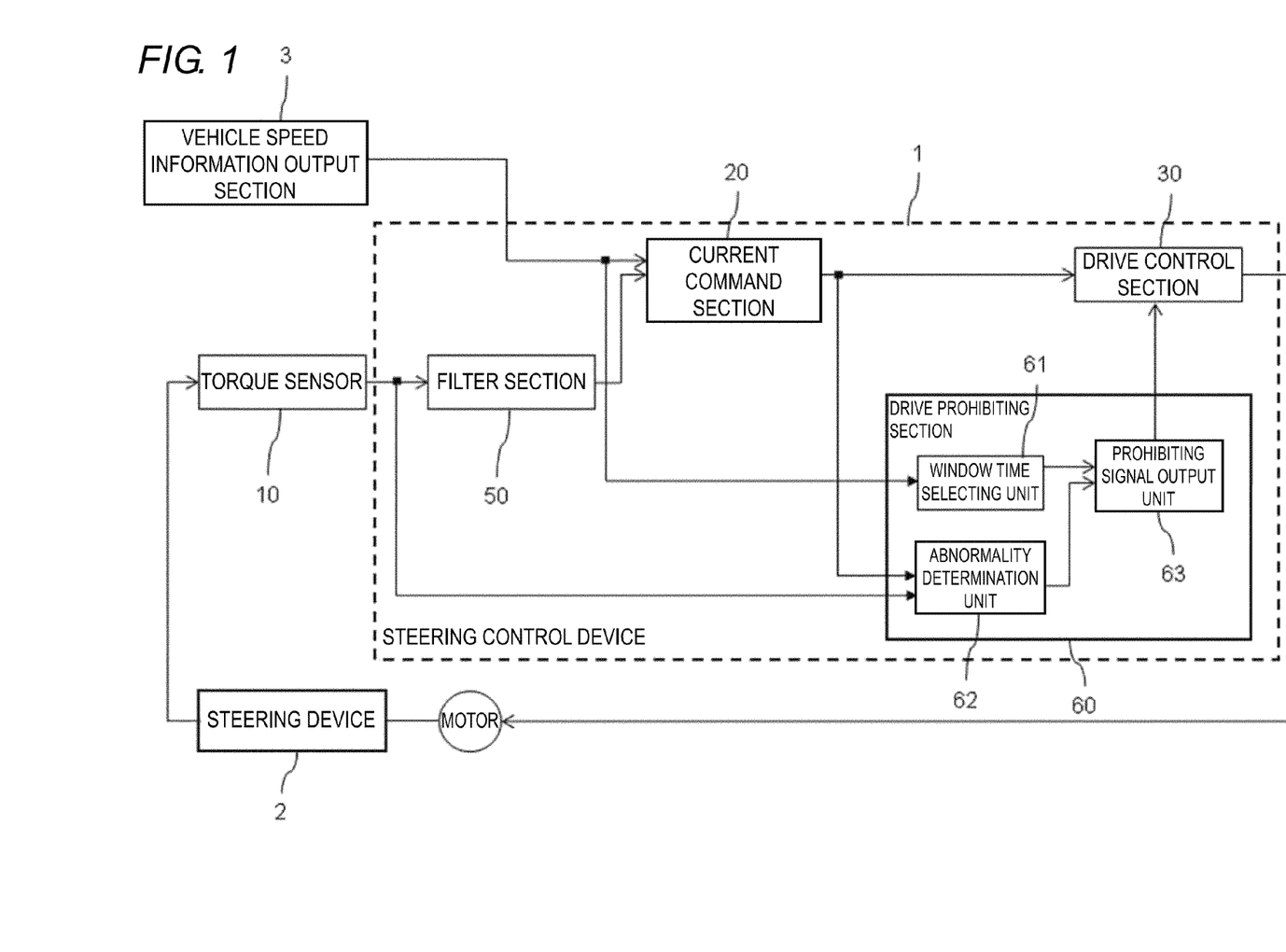
FIG. 1 is a block diagram showing a steering control device of a first embodiment of the present invention.

FIG. 1 is a block diagram of a steering control device 1 according to a first embodiment. The steering control device 1 obtains information of a steering torque from a torque sensor 10, which detects the steering torque applied on a steering device 2 by a driver of a vehicle, and obtains information of a vehicle speed from a vehicle speed information output section 3, which detects and outputs travelling speed of the vehicle. The steering control device 1 controls current of a motor for driving the steering device 2 to provide steering assistance with respect to the steering torque by the driver based on the information from the torque sensor 10 and the vehicle speed information output section 3.

The steering control device 1 includes a current command section 20, a drive control section 30, a filter section 50, and a drive prohibiting section 60. The filter section 50 is a low pass filter having a predetermined constant for removing the high frequency component from the output of the torque sensor 10 and passing only the low frequency component. The vibration transmitted from the steering wheel to the driver is thereby alleviated, thus enhancing the comfortableness in driving. The information of the steering torque having passed the filter section 50 is output to the current command section 20.

The current command section 20 calculates a current command value based on the travelling speed of the vehicle output from the vehicle speed information output section 3, and the steering torque output from the filter section 50, and outputs the same. Various methods can be considered for the calculation method of the current command value by the current command section 20. For example, the current command section 20 may hold the current value at which a torque auxiliary force corresponding to the travelling speed and the steering torque can be driven, and output the current value corresponding to the travelling speed and the steering torque as a command value when acquiring the travelling sped from the vehicle speed information output section 3 and the steering torque from the filter section 50. The current command value output by the current command section 20 is output with respect to the drive control section 30 and the drive prohibiting section 60.

The drive control section 30 controls the drive of the motor aiding the steering of the steering device 2 based on the current command value. In other words, the drive control section 30 drives the motor aiding the steering of the steering device 2 according to the current command value and performs steering assistance with respect to the driver.

The drive prohibiting section 60 outputs a signal prohibiting the drive of the motor to the drive control section 30 based on the steering torque output by the torque sensor 10, the current command value output by the current command section 20, and the travelling speed output by the vehicle speed information output section 3 to control the drive control section 30. The drive prohibiting section 60 includes a window time selecting unit 61, an abnormality determination unit 62, and a prohibiting signal output unit 63.

The window time selecting unit 61 selects a window time based on the travelling speed of the vehicle output by the vehicle speed information output section 3. The abnormality determination unit 62 determines whether or not the relationship between the steering torque, which is the output of the torque sensor 10, and the current command value output by the current command section 20 is abnormal. The method of selecting the window time and the method of determining whether or not abnormal will be described later.

The prohibiting signal output unit 63 outputs a signal for prohibiting the drive of the motor for driving the steering device 2 to the drive control section 30 based on the outputs of the abnormality determination unit 62 and the window time selecting unit 61. More specifically, the prohibiting signal output unit 63 outputs a signal for prohibiting the drive of the electric motor to the drive control section 30 when a time in which the determination result of the abnormality determination unit 62 indicates abnormality exceeds the window time selected by the window time selecting unit 61.

Figure 2:
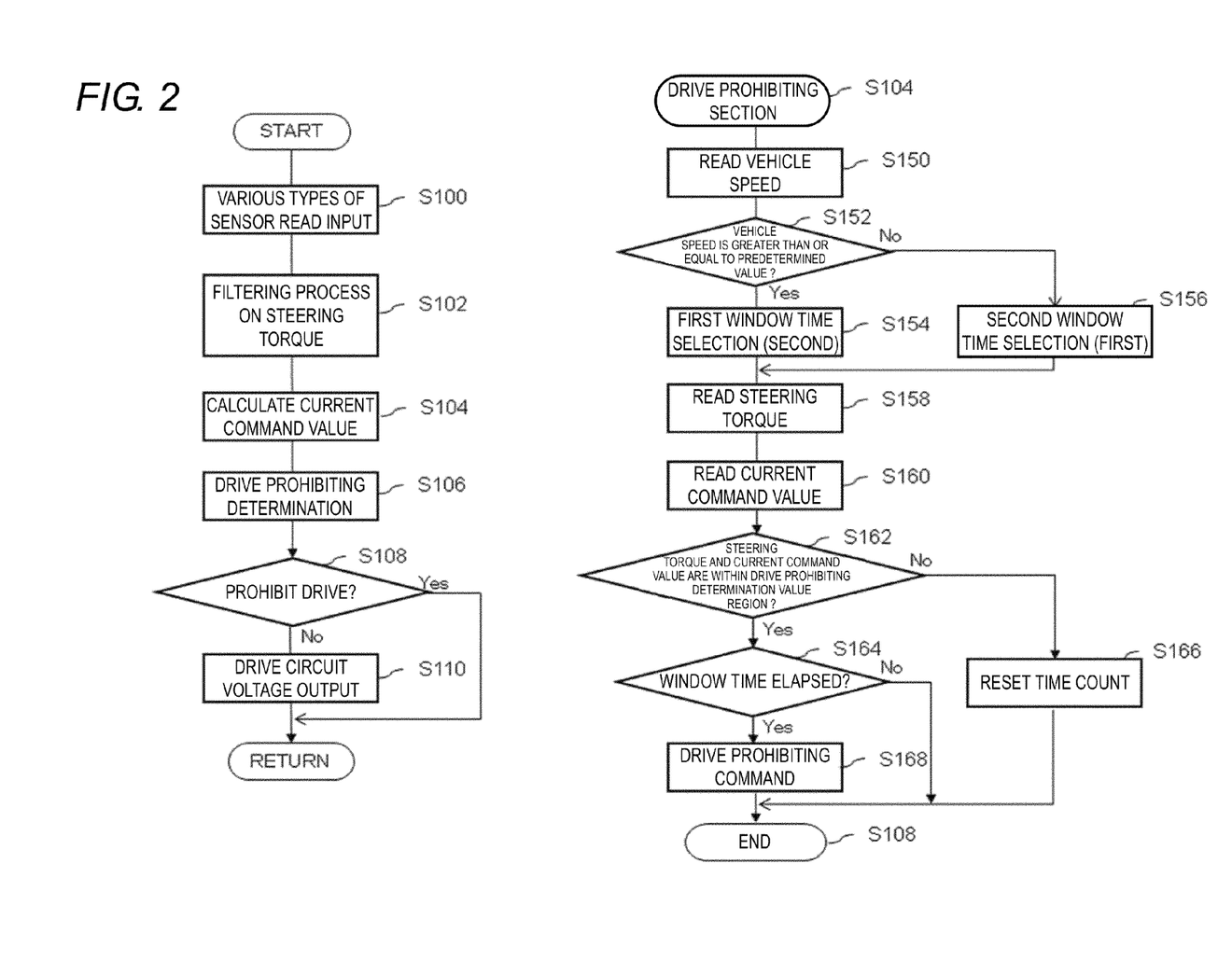
FIG. 2 is a flowchart showing control steps in the steering control device of the first embodiment of the present invention.

The function of the drive prohibiting section 60 will be more specifically described with reference to FIG. 2. First, various types of sensors read input values in S100. Specifically, the vehicle speed information output section 3 arranged in the vehicle reads the travelling speed of the vehicle, and the torque sensor 10 reads the steering torque of the steering device 2. In S102, the filter section 50 then performs filtering process of removing the high frequency component from the information of the read steering torque. In S104, the current command section 20 calculates the current command value based on the travelling speed of the vehicle output by the vehicle speed information output section 3, and the steering torque output by the filter section 50.

The drive prohibiting determination is carried out in S106. The details of the drive prohibiting determination will be described in S150 to S168. First, in the drive prohibiting determination, the window time selecting unit 61 reads the travelling speed from the vehicle speed information output section 3 in S150. The window time selecting unit 61 then determines whether or not the travelling speed is greater than or equal to a predetermined value in S152. The predetermined value is defined as a travelling speed at which the driver may greatly cut the steering device 2 to the left or the right through the steering wheel, and is a value of 0 to 5 Km/hr, for example.

The window time selecting unit 61 selects a first window time in S154 if the travelling speed is greater than or equal to the predetermined value, and selects a second window time in S156 if the travelling speed is smaller than the predetermined value. The first window time is set to be shorter than the second window time. In other words, the window time selecting unit 61 sets the window time short if the travelling speed is greater than or equal to the predetermined value, and sets the window time long if the travelling speed is smaller than the predetermined value. Accordingly, the steering control device in which the safety in driving is further enhanced can be provided.

The abnormality determination unit 62 then reads the steering torque output by the torque sensor 10 in S158 and reads the current command value output by the current command section 20 in S160. In S162, the abnormality determination unit 62 determines whether or not the read steering torque and current command value are within a region of a drive prohibiting determination value.

Figure 3:
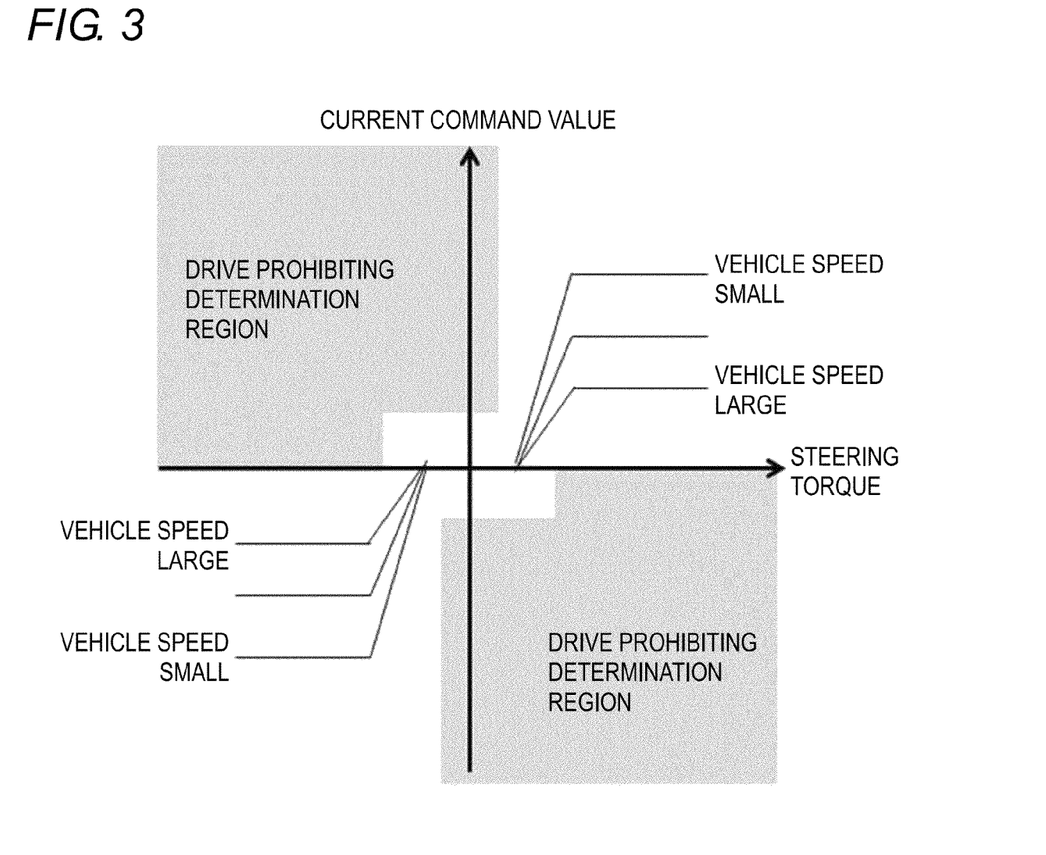
FIG. 3 is a determination map in the steering control device of the first embodiment of the present invention.

A method for determining whether or not within the region of the drive prohibiting determination value will now be described with reference to the determination map shown in FIG. 3. The determination map is a table showing the drive prohibiting condition, which is the condition for prohibiting the steering assistance, as a relationship between the steering torque and the current command value. In the determination map, the region indicated as the drive prohibiting determination region is a region indicating that the current command value is not desirable with respect to the steering torque. In other words, the drive prohibiting determination region is set as a region where, although various controls such as inertia control and the like are performed each time the steering assistance is carried out, the possibility of entering the region is low unless the steering wheel is rapidly and greatly cut even in view of such controls. Specifically, the drive prohibiting determination region is a region in which an absolute value of the steering torque is greater than or equal to a predetermined value and/or an absolute value of the current command value is greater than or equal to a predetermined value.

The determination map also describes a table indicating the relationship between the steering torque and the current command value with the travelling speed (vehicle speed) as a parameter. The setting is such that the absolute value of the current command value increases as the travelling speed decreases or as the absolute value of the output of the filter section 50 increases. Thus, the current command value increases as the vehicle becomes slower or as the steering wheel becomes heavier, and hence the force for assisting the steering becomes larger and the steering operation of the driver is facilitated. When the absolute value of the output of the filter section 50 is a small value of an extent the steering assistance is not required, the corresponding current command value is zero. When the absolute value of the steering torque becomes greater than or equal to the predetermined value, the current command value does not proportionally increase but becomes a constant value, and hence not a very large steering assistance is carried out. Such tables are held in advance in a predetermined storage region.

When determining that the steering torque and the current command value are in the drive prohibiting determination region shown in the determination map in S162, the abnormality determination unit 62 determines whether or not the window time selected in S154 or S156 has elapsed from when entering the drive prohibiting determination region in S164. If the abnormality determination unit 62 determines that the window time has elapsed, the prohibiting signal output unit 63 issues a drive prohibiting command to the drive control section 30 in S168. In other words, the prohibiting signal output unit 63 of the drive prohibiting section 60 prohibits the drive of the motor when the time in which the determination result of the abnormality determination unit 62 indicates abnormality exceeds the window time selected by the window time selecting unit 61.

When determining that the steering torque and the current command value are not within the drive prohibiting determination region shown in the determination map in S162, the abnormality determination unit 62 resets the count of the elapsed time from when entering the drive prohibiting determination region in S166. The driver receives an appropriate steering assistance corresponding to the travelling speed by the steering control device 1.

The abnormality determination unit 62 does not issue the drive prohibiting command when determining that the window time selected in S154 or S156 has not elapsed from when entering the drive prohibiting determination region in S164. The processing proceeds while the abnormality determination unit 62 continues timing.

After the drive prohibiting determination of S150 to S168, that is, S106 is performed, whether or not a command for prohibiting the drive is issued is checked in S108. If the prohibiting signal output unit 63 has not issued the drive prohibiting command, the drive control section 30 drives the motor for driving the steering device 2 in S110. If the drive prohibiting command has been issued, the drive control section 30 stops the drive of the motor. Thereafter, the control is returned to the call-out side. Accordingly, the abnormality determination corresponding to the travelling speed can be carried out by providing the window time corresponding to the travelling speed even if the relationship between the magnitude and the direction of the steering torque and the magnitude and the direction of the current command value is within the drive prohibiting determination region. As a result, the steering control device 1 satisfying both comfortableness and safety in driving corresponding to the travelling speed can be provided.

Conventionally, it is known to perform the low pass filtering process on the output of the torque sensor. The high frequency component is thereby removed from the output of the torque sensor, and the high frequency component of the current flowing to the motor is also reduced. The vibration from the steering wheel is thus also alleviated, thus enhancing the comfortableness in driving.

However, because the computation time of the low pass filtering process is necessary, the following may occur. For example, when the driver rapidly switches the steering wheel from the right direction to the left direction, the motor rotates in the direction of assisting the right turn until elapse of the time required for the computation of the low pass filtering process. Since the actual steering wheel is rotated to the left by the user, the rotating direction of the motor and the rotating direction of the steering wheel become opposite, although for a short time. The CPU then determines that abnormality has occurred in the process of computing the command current based on the steering torque, and stops the drive of the motor. Thus, the steering assistance of the motor-driven power steering for the driver is suddenly interrupted, which may cause a sense of discomfort.

Such situation relatively easily occurs when the vehicle speed is low. For example, since the steering wheel needs to be rapidly turned to the left and the right when parking the vehicle in the garage or when performing parallel parking, the steering torque and the command current tend to easily be in an abnormal state, and the number of times the rotating direction of the motor and the rotating direction of the steering wheel become opposite, although for a short time, tends to increase. When the rotating direction of the motor and the rotating direction of the steering wheel are opposite, a force stronger than usual is necessary to turn the steering wheel. However, accidents rarely occur therefrom since the vehicle speed is low. Even if a temporary abnormality actually has occurred in the CPU, accidents rarely occur since the vehicle speed is low. Therefore, according to one or more embodiments of the present invention, when the vehicle speed is low, the drive of the motor is not immediately stopped, even when the relationship between the steering torque and the command current is abnormal in terms of comfortableness in driving.

If the vehicle speed is high, on the other hand, the opportunity to rapidly turn the steering wheel is few, and the steering torque and the command current are less likely to be in an abnormal state. Thus, according to one or more embodiments of the present invention, the drive of the motor is immediately stopped when the steering torque and the command current are in an abnormal state. Furthermore, according to one or more embodiments of the present invention, the drive of the motor is immediately stopped in the interest of safety if the abnormality actually has occurred in the CPU.

Second Embodiment

Figure 4:
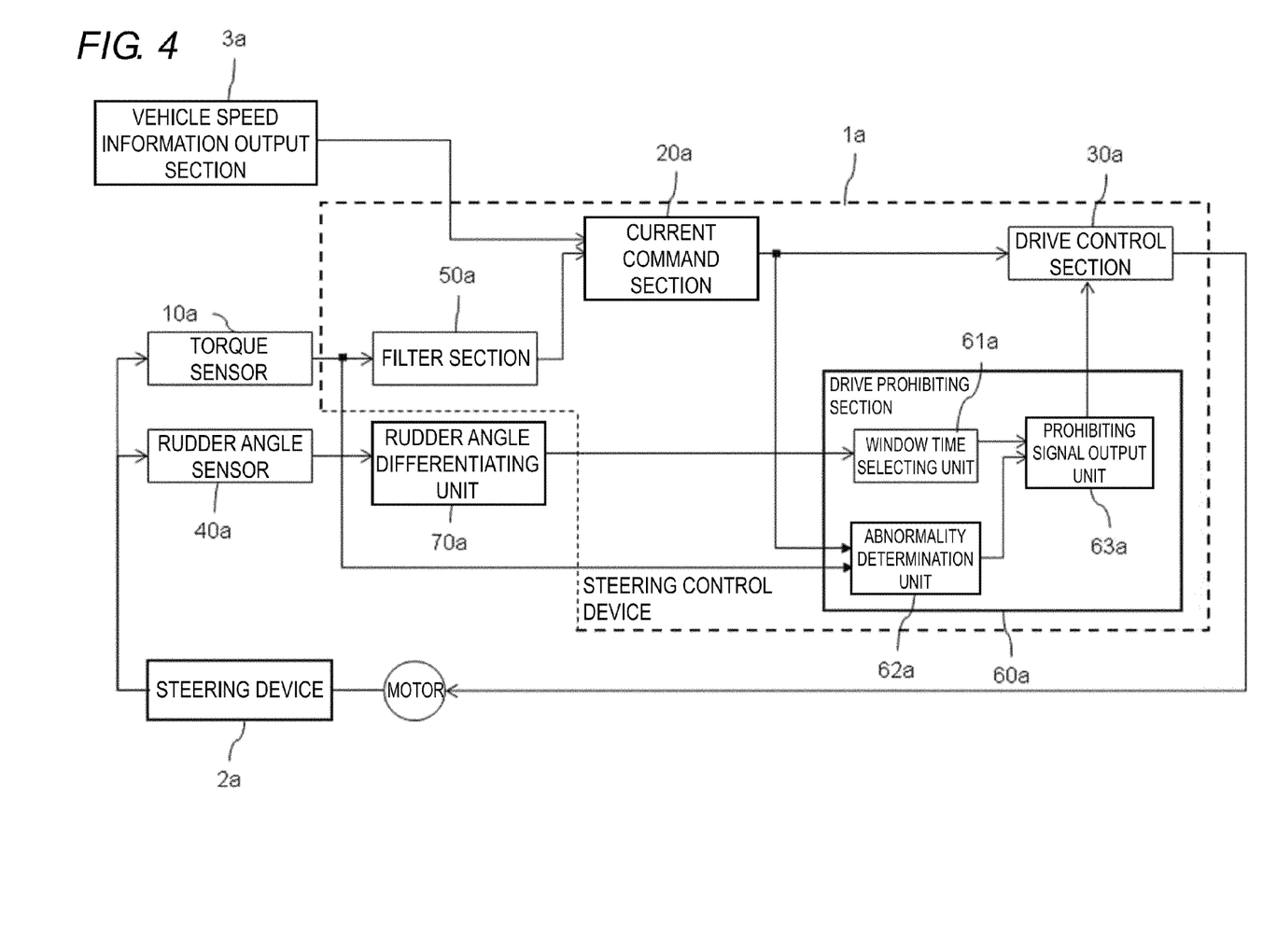
FIG. 4 is a block diagram showing a steering control device of a second embodiment of the present invention.

FIG. 4 is a block diagram showing a steering control device 1a according to a second embodiment. The portions different from those of the first embodiment will be centrally described to avoid redundant description. In the first embodiment, the travelling speed of the vehicle output from the vehicle speed information output section 3a is input to the window time selecting unit 61, but an angular speed output from a steering angle differentiating unit 70a is input in the second embodiment.

In the vehicle applied with the second embodiment, a steering angle sensor 40a for detecting the rotation angle of the steering wheel is further arranged in addition to a torque sensor 10a with respect to a steering device 2a. The steering angle differentiating unit 70a calculates a differential value to obtain the speed of the rotation angle of the steering wheel detected by the steering angle sensor 40a, and outputs the angular speed (rotating steering angle speed) of the steering wheel. A window time selecting unit 61a selects a window time based on such an angular speed. Other configuring elements are the same as those of the first embodiment.

Figure 5:
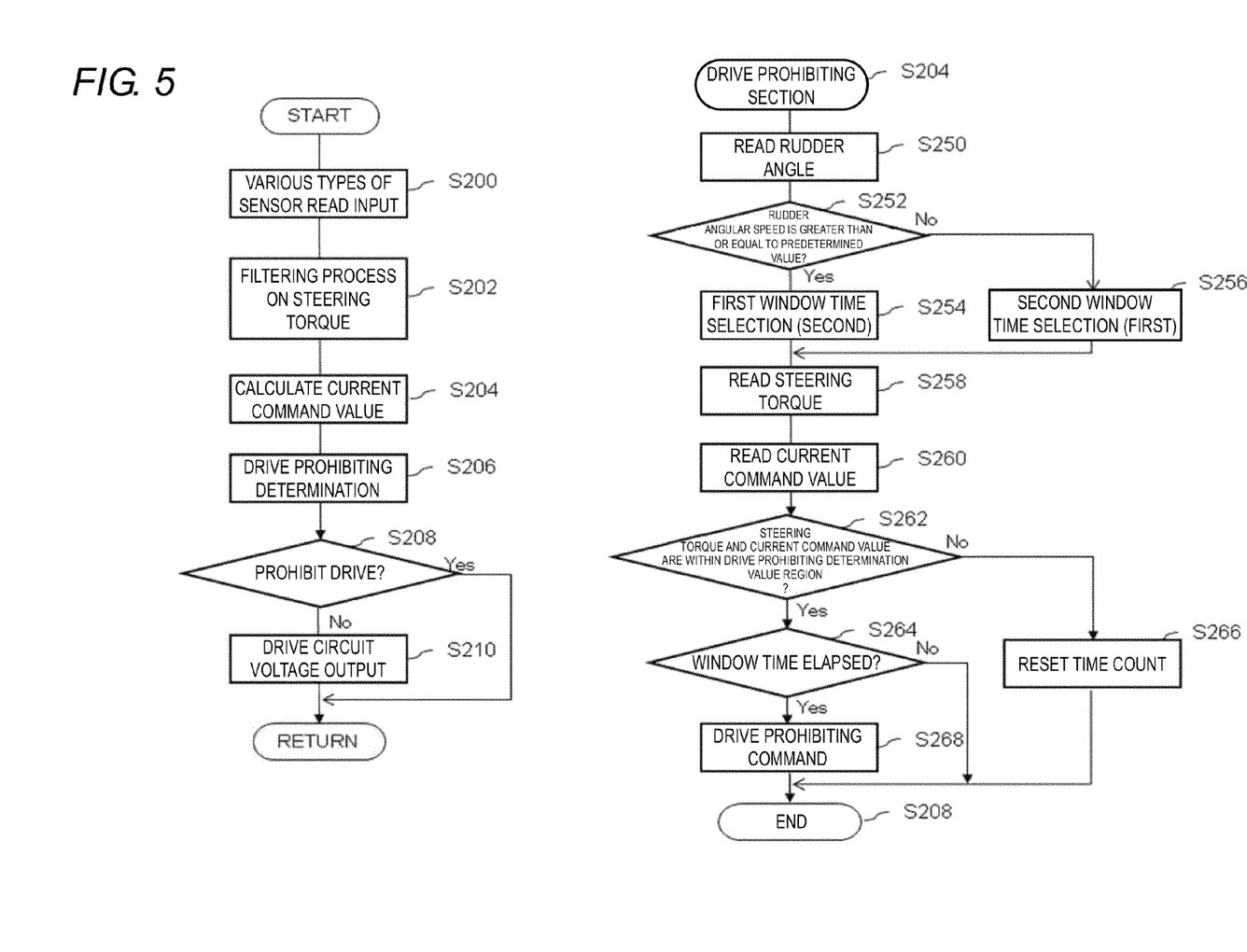
FIG. 5 is a flowchart showing control steps in the steering control device of the second embodiment of the present invention.

FIG. 5 is a flowchart showing control steps in the steering control device 1a of the second embodiment, where the portions different from those of the first embodiment are centrally described to avoid redundant description, similar to the description of FIG. 4. In the first embodiment, the vehicle speed is read in S150 and whether or not the travelling speed of the vehicle is greater than or equal to a predetermined value is determined in S152. In the second embodiment, the angular speed (rotating steering angle speed) of the steering wheel is read in S250 and whether or not the angular speed is greater than or equal to a predetermined value is determined in S252. Other steps are the same as those of the first embodiment.

The predetermined value is defined as an angular speed at which the driver may greatly cut the steering device 2 to the left or the right through the steering wheel, and is a value of 6 to 20 radian/second, for example. Accordingly, the steering control device 1a satisfying both comfortableness and safety in driving can be provided.

The present invention is not limited to the illustrated embodiments, and the configuration within a scope not deviating from the content described in the claims may be implemented.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A steering control device comprising:
   a filter section configured to remove a high frequency component from an output of a torque sensor configured to detect a steering torque of a steering device mounted on a vehicle;
   a current command section configured to output a current command value based on a travelling speed of the vehicle and an output of the filter section;
   a drive control section configured to control a drive of a motor configured to aid a steering of the steering device based on the current command value; and
   a drive prohibiting section configured to output a signal for prohibiting the drive of the motor to the drive control section based on the output of the torque sensor, the current command value, and the travelling speed of the vehicle,
   wherein the drive prohibiting section comprises:
      an abnormality determination unit configured to determine whether or not a relationship between the output of the torque sensor and the current command value is abnormal,
      a window time selecting unit configured to select a window time based on the travelling speed of the vehicle, and
      a prohibiting signal output unit configured to output the signal for prohibiting the drive of the motor to the drive control section based on outputs of the abnormality determination unit and the window time selecting unit, and
   wherein the prohibiting signal output unit outputs the signal for prohibiting the drive of the motor to the drive control section when a time in which a determination result of the abnormality determination unit indicates abnormality exceeds a window time selected by the window time selecting unit.

2. The steering control device according to claim 1, wherein the window time selecting unit selects a short window time when the travelling speed of the vehicle is greater than or equal to a predetermined value.

3. A steering control device comprising:
   a filter section configured to remove a high frequency component from an output of a torque sensor configured to detect a steering torque of a steering device mounted on a vehicle;
   a current command section configured to output a current command value based on a travelling speed of the vehicle and an output of the filter section;
   a drive control section configured to control a drive of a motor configured to aid a steering of the steering device based on the current command value; and
   a drive prohibiting section configured to output a signal for prohibiting the drive of the motor to the drive control section based on the output of the torque sensor, the current command value, and an angular speed of the steering device,
   wherein the drive prohibiting section comprises:
      an abnormality determination unit configured to determine whether or not a relationship between the output of the torque sensor and the current command value is abnormal,
      a window time selecting unit configured to select a window time based on the angular speed of the steering device, and
      a prohibiting signal output unit configured to output the signal for prohibiting the drive of the motor to the drive control section based on outputs of the abnormality determination unit and the window time selecting unit, and
   wherein the prohibiting signal output unit outputs the signal for prohibiting the drive of the motor to the drive control section when a time in which a determination result of the abnormality determination unit indicates abnormality exceeds a window time selected by the window time selecting unit.

* * * * *